United States Patent Office 3,849,535
Patented Nov. 19, 1974

3,849,535
METHOD FOR RECOVERY OF ELEMENTS AND COMPOUNDS FROM AQUEOUS SOLUTIONS
Meherwan C. Irani, Pittsburgh, Pa., assignor of a fractional part interest to Eugene F. Buell
No Drawing. Filed Jan. 8, 1969, Ser. No. 789,952
Int. Cl. C01b 33/12; C01g 49/02
U.S. Cl. 423—140                                      6 Claims

ABSTRACT OF THE DISCLOSURE

A method is provided for recovering from aqueous solutions dissolved elements and compounds which form gelatinous solids when precipitated, consisting of precipitating such elements and compounds by chemical reaction as a gelatinous solid, separating the gelatinous precipitate from solution, adding to the precipitate enough of a material capable of absorbing water as water of crystallization or by forming of hydroxide, drying to remove uncombined water, dissolving the water soluble constituent in water, allowing the insoluble constituent to settle and separating the insoluble constituent from the water.

---

This invention relates to methods for recovery of elements and compounds from aqueous solutions or precipitates and particularly to recovery of elements and compounds from spent pickle liquor, acid mine water, byproduct ferrous sulfate from manufacture of titanium dioxide from ilmenite, and pregnant solutions or precipitates resulting from chemical processing or scrubbing of off gases for control of atmospheric pollution.

The process of this invention is of particular importance at the present time because it provides a solution to the urgent problem of disposal of aqueous wastes by economically removing all dissolved salts except alkaline salts from such wastes prior to discharging them into surface or underground sources of waters.

It is known that when certain soluble salts are chemically precipitated, the precipitate is gelatinous which makes it difficult to recover economically the solid constituent of the gelatinous precipitate. For example, when acid mine water containing dissolved iron, aluminum, calcium and magnesium is neutralized by an alkali, the resulting precipitate is gelatinous and it does not compact even after an extended settling period to a thickened product of significant solid content. Due to the difficulty of settling, filtering and drying such material, the sludge presents serious disposal problems.

I have found that by adding to the gelatinous precipitate an anhydrous salt which is capable of absorbing water as water of crystallization or which forms hydroxide by reacting with water, the gelatinous structure of the precipitate is destroyed. When the precipitate so treated is mixed with water, it settles in a granular non-gelatinous form which can be readily separated from the aqueous solution. The material thus prepared dries readily at atmospheric temperatures producing free flowing non-caking granular powder.

I have found that by adding anhydrous soda ash (sodium carbonate) to the waste pickle liquor, the mixture turns to a greenish slurry which on standing sets to a solid mass. The mixture has a greenish color when freshly prepared but changes gradually to brown color. The change in color starts from the outside layer and progressively penetrates to the core of the mass. The cured product thus obtained is a mixture of sodium sulfate, iron carbonate and excess soda ash with all the water originally present in the waste pickle liquor tied up as $Na_2SO_4 \cdot 10H_2O$, $Na_2CO_3 \cdot 10H_2O$ and $FeCO_3 \cdot H_2O$.

When this solidified cured mixture of soda ash and spent sulfuric pickle liquor is stirred with water, sodium sulfate and sodium carbonate go into solution and iron carbonate settles down rapidly. The iron carbonate residue so obtained is easy to free by washing by decantation, of contaminants like sodium carbonate, and sodium sulfate. The residual washed iron carbonate particles are of high purity and being not gelatinous dry readily at atmospheric temperatures producing free flowing non-caking iron carbonate from which high grade pigment of great hiding power could be prepared. The iron carbonate thus obtained is excellent for making high grade fine particle size pure iron powder and is also suitable for use as coating for manufacture of magnetic sound and television recording tape, manufacture of ferrites like barium ferrites which are increasingly being used as ferromagnetic materials for making cores of small electric motors, permanent magnets, etc.

In the case of acid mine water which contains dissolved ferrous sulfate and free sulfuric acid and has a pH of about 3, enough soda ash (sodium carbonate) is added to the water to bring it to pH 8 when the free sulfuric acid is neutralized and ferrous sulfate precipitates with the formation of sodium sulfate which remains in solution. Other soluble impurities usually alkali-earth salts also precipitate as insoluble carbonates at pH 8. However, the precipitate is gelatinous and settles on standing to a gelatinous sludge. The gelatinous precipitate is very difficult to decant and filter and when the filtered gelatinous precipitate is dried by heating it cakes to a hard mass.

I have discovered that if the filtered precipitated gelatinous sludge is mixed with enough soda ash (sodium carbonate) to make a paste and the paste so prepared is allowed to stand for several hours, the paste sets to a hard mass and changes its color from greenish to brown as in the case of the waste pickle liquor described above. Now, when the hardened cured product is dissolved in water, sodium sulfate and excess soda ash being water soluble are leached out and the iron as insoluble iron carbonate rapidly settles to the bottom in a non-gelatinous granular physical form which it is easy to remove the impurities consisting mainly of alkali earth hydrated oxides or carbonates by repeated washing by decantation and filtration. The resulting iron carbonate is pure, of soft texture and of fine particle size suitable for use as pigment, for manufacture of high grade fine particle size iron powder, for manufacture of ferrites, etc. The filtrate obtained after removal of iron contains sodium sulfate and sodium carbonate in solution which may be removed by evaporating the solution and recovering the mixed sodium sulfate, sodium carbonate crystals.

While I have described the use of soda ash for neutralizing the acid mine water to pH 8 and also mixing soda ash with gelatinous sludge resulting from neutralization of the acid mine water, it is understood that other alkali and alkali earth oxides, hydroxides and carbonates, anhydrous ammonia, or any anhydrous salt which is capable of absorbing water as water of crystallization, for example anhydrous $Al_2(SO_4)_3$ or form hydroxide by reacting with water, for example $CaO$ may be used.

Starting materials for the process may be by-product sulfate pickle liquor, by-product ferrous sulfate from manufacture of titanium dioxide from ilmenite waste or pregnant solutions from processing of ores, metals and minerals, aqueous solutions resulting from scrubbing of off gases resulting from condensation of sulfate containing fuels, spent hydrochloric acid pickle liquor and crystalline solids containing combined water of crystallization, for example $FeSO_4 \cdot 10H_2O$; $Al_2(SO_4)_3 \cdot 18H_2O$ may be used. These materials may be used individually or in combination.

While any or all of these materials could be used, the preferred materials are waste sulfate or chloride pickle liquor or sludge from neutralization of acid mine water and commercial grade anhydrous soda ash.

The following specific example will illustrate the process:

EXAMPLE

To 100 grams of spent sulfate pickle liquor from steel processing containing 7 grams of free sulfuric acid ($H_2SO_4$), 22 grams of soda ash ($Na_2CO_3$) was added at 100° C. The green precipitate formed was allowed to settle overnight and separated from the supernatant liquid by decantation. To the decanted precipitate enough soda ash was added with constant stirring to form a pasty mass. The paste was spread out over a flat surface and allowed to dry overnight. It was then stirred with water and the stirred product allowed to settle. The insoluble precipitate of iron oxide settled down rapidly. It was separated from the supernatant liquid by decantation and repeated washing.

The washed precipitate was filtered and dried at atmospheric temperature. The dried iron oxide obtained was granular and free flowing material.

Many changes can be made in the details of steps of the process without departing from the spirit of the invention. The inventor, therefore, does not wish to be restricted to the exact details and arrangements described, the preferred forms, and steps only have been shown and described by way of illustration. The process is applicable to recovery of any chemical compound which precipitates out from aqueous solutions in gelatinous form as a result of chemical reaction. The gelatinous precipitate may be mixed or reacted with any compatible material capable of absorbing water as water of crystallization or form hydroxide or hydrate by reacting with water. The mixed material may be heated to a temperature high enough to drive out the water of crystallization or decompose the hydrate or the water may be removed under reduced pressure or in vacuum prior to adding water to the mixed material.

While I have disclosed certain preferred practices of my invention in the foregoing specification, it will be understood that this invention may be otherwise embodied within the scope of the following claims.

I claim:

1. A process for recovery from aqueous solutions dissolved iron and iron compounds which form gelatinous iron solids containing water when precipitated from such solutions, consisting of precipitating such iron and iron compounds by means of a chemical reaction to form said gelatinuous iron precipitate containing water in an aqueous solution, separating the gelatinuous iron precipitate from the solution, adding to the gelatinous iron precipitate enough of a material capable of absorbing water as one of the forms water of crystallization and hydroxide from said gelatinous iron precipitate and selected from the group consisting of alkali and alkaline earth oxides, hydroxides and carbonates, and anhydrous salts capable of absorbing water as water of crystallization, drying the resulting mixture to remove the uncombined water, stirring the product in sufficient water to dissolve water soluble constituents, allowing the insoluble constituents to settle and separating the settled residue from water.

2. A process for recovery of the solid component of an aqueous slurry of a water insoluble gelatinous iron precipitate by adding to the slurry enough of a material capable of combining with all of the water in the gelatinous iron precipitate slurry to destroy the gelatinous structure of the precipitate and selected from the group consisting of alkali and alkaline earth oxides, hydroxides and carbonates, and anhydrous salts capable of absorbing water as water of crystallization, adding water to the mixture to dissolve water soluble material and separating the insoluble residue from the solution.

3. A process as claimed in claim 2 in which after adding to the gelatinous slurry enough of the material capable of combining with all of the water in the gelatinous precipitate slurry, the mixture is dried and then water added to the mixture.

4. A process as claimed in claim 2 in which enough of the material capable of combining with all of the water in the gelatinous precipitate only is added to the slurry and then the mixture is dried and added to water to dissolve out the soluble component.

5. A process as claimed in claim 2 in which the material added to the slurry of gelatinous precipitate is anhydrous soda ash (sodium carbonate).

6. A process as claimed in claim 5 in which the gelatinous precipitate is obtained by neutralization of waste sulfuric or hydrochloric acid pickle liquor.

References Cited

UNITED STATES PATENTS

| | | | |
|---|---|---|---|
| 2,608,468 | 8/1952 | Nahas | 423—633 X |
| 2,639,222 | 5/1953 | Tanski | 423—632 X |
| 3,424,574 | 1/1969 | Irani | 75—53 |
| 918,744 | 4/1909 | Fryklind | 210—192 X |
| 1,424,635 | 8/1922 | Fireman | 23—200 |
| 1,531,990 | 3/1925 | Speller | 23—200 X |
| 1,877,368 | 9/1932 | Seyer | 23—1 |
| 1,504,549 | 7/1924 | Govers | 23—182 |
| 1,571,054 | 1/1926 | Hosenfeld | 23—182 |
| 1,813,272 | 7/1931 | Biltz | 23—182 |

FOREIGN PATENTS

| | | | |
|---|---|---|---|
| 714,616 | 9/1931 | France | 23—1 |
| 1,127,901 | 8/1956 | France | 23—1 |

OTHER REFERENCES

Cassidy: "Adsorption and Chromatography," 1951, pp. 197–198.

MILTON WEISSMAN, Primary Examiner

U.S. Cl. X.R.

423—338, 632